Sept. 14, 1937.    R. L. STOUT ET AL    2,093,217
AUTOMOBILE RADIO ANTENNA
Filed Dec. 23, 1936
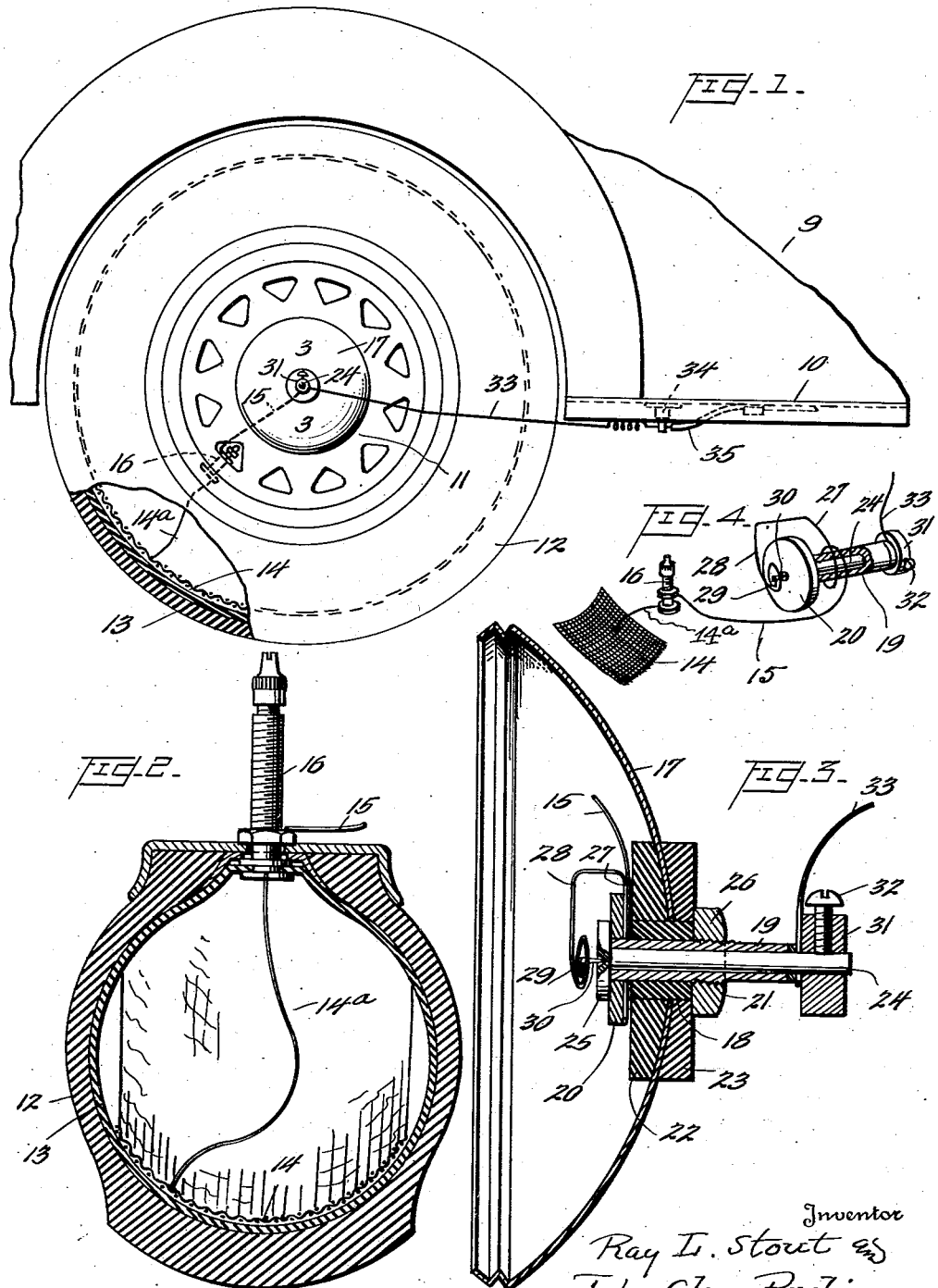

Patented Sept. 14, 1937

2,093,217

UNITED STATES PATENT OFFICE 2,093,217

AUTOMOBILE RADIO ANTENNA

Ray Lee Stout, Ashtabula, and John Alva Povlis, Jefferson, Ohio

Application December 23, 1936, Serial No. 117,402

4 Claims. (Cl. 250—33)

This invention relates to improvements in automobile radio apparatus and has for its principal object the mounting of the radio antenna in one of the wheels supporting the vehicle so that a maximum pick-up of the ground waves is accomplished.

A practical embodiment of this invention is shown in the drawing accompanying this specification wherein the antenna is shown placed in the inner tube of a tire supporting the vehicle in such a manner that it floats freely therein, thus keeping it away from all external pressures that might injure the casing, tube, or the antenna itself. By mounting the antenna as described, its proximity to the earth is such that sufficient pick-up is obtained to reduce the motor noise to a minimum.

These and other objects hereinafter set forth are obtained by the means illustrated in the accompanying drawing in which Fig. 1 is a side elevation of one of the wheels supporting an automobile, part of the wheel being broken away to show a detail of the apparatus. Adjacent parts of an automobile are also shown.

Fig. 2 is a cross section on the line 2—2 of Fig. 1.

Fig. 3 is a vertical cross section on the line 3—3 of Fig. 1.

Fig. 4 is a detail perspective view of the radio system detached from the vehicle.

Similar reference numerals in all the figures designate like parts.

In the drawing 9 designates a part of an automobile including the running board 10. One of the carrying wheels is designated by 11 on which is mounted a tire 12 in which is mounted an inner tube 13. In the embodiment of the invention shown in the drawing, the aerial itself is a pliable metal screen 14 placed in the inner tube 13 so that it floats freely therein. This aerial is a bead which encircles the wheel as shown in Fig. 1. In order to promote maximum simplicity in structure the screen 14 is connected to the metal part of the valve stem 16 by means of a wire or lead 14a. An electrical conductor 15 connects the valve stem 16 with an electrical brush 28. To connect the aerial with the radio set in the car, a hub cap 17 constructed as shown in the drawing is provided. The hub cap 17 has an aperture in its center in which a bushing 18 is fitted, this bushing being preferably of insulating material. Extending through bushing 18 is a hollow oil-less brass bushing 19 having a flange 20 at one end and a threaded portion 21 intermediate of its ends. Blocks of insulating material 22 and 23, shaped to conform to the hub cap, are placed on the inside and outside of the hub cap 17 respectively. A steel shaft 24 extends through the brass bushing 19 and is so fitted therein that the bushing will rotate freely around it. The shaft 24 is provided with a flange 25 to prevent it from moving outwardly of the wheel. A nut 26 is screwed on the bushing 19 holding the parts 18, 22 and 23 in position. 28 designates an electrical brush comprised of an annular portion 27 interposed between the flange 20 and the block 22, and a coil spring 29 having a needlepoint 30 extending therefrom to contact the steel shaft 24. The needlepoint 30 is held in contact with the steel shaft 24 by the tension of the coil spring. A collar 31 secured on the shaft 24 by a set screw 32 forms a terminal for the conductor 33. The other end of the conductor 33 is connected to a terminal 34 which is mounted under the running board 10 and insulated therefrom. From the terminal 34 the lead continues to the radio set through a shielding conduit 35.

The apparatus operates as follows: Radio energy is picked up by the metal screen 14 and is conducted therefrom to the radio set in the car by the following elements. Wire 14a to the valve stem 16 which is connected to the member 28 by a conductor 15. The member 28 rotating with the wheel contacts the stationary shaft 24 by means of the needlepoint 30 which acts as an electrical brush, whereby the energy is transmitted from the member 28 to and through the shaft 24 from where it is conducted to the terminal 34 by the lead 33. The lead 33 also prevents the shaft 24 from turning. From the terminal 34 a lead extends to the radio set through the shielding tube 35.

It is readily seen how various changes might be made in the construction shown in the drawing without departing from the spirit of our invention as indicated by the appended claims.

We claim:

1. In a radio apparatus for vehicles, an antenna mounted in a tire carried by a wheel supporting said vehicle and having a lead extending therefrom to the radio set.

2. In a radio apparatus for automobiles, an aerial carried in an inner tube of a tire mounted on one of the wheels carrying the vehicle, a lead extending from the aerial to the outside of the tube and connections therefrom to the radio set.

3. In a radio apparatus for vehicles, an antenna carried in an inner tube in the tire casing mounted on a wheel supporting the vehicle, a lead extending from said antenna to and through the valve stem of the inner tube, a lead extending therefrom to and through the hub cap of the wheel, said lead being insulated from the metal parts of the wheel, and another lead extending therefrom to the radio set.

4. In a radio apparatus for vehicles, an antenna carried in an inner tube in the tire casing mounted on one of the running wheels of the vehicle, a lead comprised of an electrical conductor connecting the antenna with the valve stem of the inner tube, another conductor connecting the valve stem with a brush carried by and rotating with the hub cap, said brush contacting a stationary metal shaft carried in the hub cap and extending therethrough, a conductor connected to said shaft and extending therefrom to the radio set in the car, said conductor being shielded from the metal parts of the car.

RAY LEE STOUT.
JOHN ALVA POVLIS.